(12) United States Patent
Tourneur et al.

(10) Patent No.: US 9,011,619 B2
(45) Date of Patent: Apr. 21, 2015

(54) METHOD OF REINFORCING A CONSTRUCTION WORK

(75) Inventors: Christian Tourneur, Le Mesnil Saint Denis (FR); Julien Mercier, Montrouge (FR)

(73) Assignee: Soletanche Freyssinet, Rueil Malmaison (FR)

( * ) Notice: Subject to any disclaimer, the term of this patent is extended or adjusted under 35 U.S.C. 154(b) by 139 days.

(21) Appl. No.: 13/345,209

(22) Filed: Jan. 6, 2012

(65) Prior Publication Data

US 2012/0177931 A1 Jul. 12, 2012

(30) Foreign Application Priority Data

Jan. 7, 2011 (EP) .................................... 11305017

(51) Int. Cl.
*B29C 70/68* (2006.01)
*E04G 23/02* (2006.01)

(52) U.S. Cl.
CPC ............ *B29C 70/68* (2013.01); *E04G 23/0218* (2013.01)

(58) Field of Classification Search
USPC ........................................ 156/307.5, 322, 71
See application file for complete search history.

(56) References Cited

U.S. PATENT DOCUMENTS

| | | | | |
|---|---|---|---|---|
| 5,997,682 A | * | 12/1999 | Goodman et al. | ......... 156/273.7 |
| 2003/0149179 A1 | | 8/2003 | Chao et al. | |
| 2004/0259448 A1 | * | 12/2004 | Nahmias et al. | ............. 442/149 |
| 2007/0059441 A1 | * | 3/2007 | Greer | ........................... 427/136 |
| 2007/0215271 A1 | | 9/2007 | McClintic | |

FOREIGN PATENT DOCUMENTS

| | | | | |
|---|---|---|---|---|
| GB | 2357985 A | * | 7/2001 | ............... B05D 7/00 |
| WO | 2007/122472 A1 | | 11/2007 | |

* cited by examiner

*Primary Examiner* — Thao T. Tran
(74) *Attorney, Agent, or Firm* — Seed IP Law Group PLLC

(57) ABSTRACT

Method of reinforcing a construction work comprising the successive steps of: applying a first layer on a surface of the construction work, the first layer comprising a curable polymer that, once it is cured, can be thermally activated for adhering to a thermoplastic material; curing said curable polymer; heating at least a surface of the first layer opposite said surface of the construction work, for thermal activation of the cured polymer; and applying a second layer over said surface of the first layer, the second layer comprising a composite including reinforcement fibers and a thermoplastic matrix, whereby the thermoplastic matrix and the thermally activated cured polymer adhere to each other.

10 Claims, 1 Drawing Sheet

METHOD OF REINFORCING A CONSTRUCTION WORK

The invention relates to a method of reinforcing a construction work and a reinforced construction work.

BACKGROUND OF THE INVENTION

The construction work can be of any type, for example a bridge or a water duct. The area to be reinforced is generally made of concrete.

One known technique for reinforcing such construction works is for instance disclosed in document WO-A-2007/122472. It consists in applying a curable resin on a surface of the construction work and, before the resin is cured, applying reinforcement fibres, generally a woven band of carbon or glass fibres, on the surface, so as to obtain a composite layer that will reinforce the construction work.

The curing may be done through heat, through a chemical reaction (two component epoxy for example) or through irradiation.

Such methods represent a very efficient way of reinforcing a construction work. However, as long as the resin is not cured, there is a risk that the fibres fall apart due to their own weight, in particular if they are applied in the form a long woven band, or due to any kind of disruption of the process, such as vibrations, while or after applying the fibres on the surface to be reinforced. Such a risk can be minimised by taking extra precautions when applying the fibres, but it cannot be totally eliminated.

Also, in case the curing spontaneously occurs through a chemical reaction between the resin components or due to a temperature change, the fibres must be applied on the surface before the curing is completed, preferably before it has even started. This leaves a given period of time for acting, sometimes rather narrow.

It is an object of the invention to solve part or all of the above mentioned problems and to provide a method of reinforcing a construction work without the risk of the reinforcement material falling apart before the curing is completed and also with less or no constraints of having to apply the reinforcement material quickly before the resin is cured.

SUMMARY OF THE INVENTION

A method of reinforcing a construction work is proposed, comprising:
  applying a first layer on a surface of the construction work, the first layer comprising a curable polymer that, once it is cured, can be thermally activated for adhering to a thermoplastic material;
  curing said curable polymer;
  heating at least a surface of the first layer opposite said surface of the construction work, for thermal activation of the cured polymer; and
  applying a second layer over said surface of the first layer, the second layer comprising a composite including reinforcement fibres and a thermoplastic matrix, whereby the thermoplastic matrix and the thermally activated cured polymer adhere to each other.

The construction work can be of any kind and the area to be reinforced can be made of various materials, in particular concrete and/or steel.

The first layer of polymer adheres to a surface of the construction work. Once the polymer has been cured, the first layer is hard and stable enough and can remain in place for an undetermined period of time. The moment for applying the second layer can be advantageously selected.

The first layer can be applied by spreading or spraying its components on the construction work surface.

By heating the first layer, at least its surface opposite the surface stuck to the construction work, the first layer can adhere to a thermoplastic material. The second layer comprising a composite with a thermoplastic matrix is contacted to the first layer. If needed a slight pressure can be applied on the composite to facilitate the adherence. Immediate and strong adherence is obtained, thus reducing the risk of the second layer falling apart. It is also possible to heat the second layer. As an alternative, both the first and second layers can be heated.

The step of applying the different layers can easily be automated. In particular, if the construction work to be reinforced is a duct, a machine can circulate inside the duct to apply the first layer. Once the first layer is cured, the second one can be applied in the same manner, using a machine that will first heat the first layer, then apply the second one.

According to embodiments of the present invention, the following features may be added and/or combined:
  the first layer further comprises a curing agent mixed with the curable polymer, the curing step being performed thanks to a reaction between the curing agent and the curable polymer. Usually the polymer and its curing agent are stored separately, then mixed before application;
  said curable polymer is a hydroxyl-terminated polymer of butadiene. This type of polymer is particularly suitable for reinforcing a concrete structure. This polymer is known as PolyBd®;
  said hydroxyl-terminated polymer of butadiene has hydroxyl functionality above or equal to 2.0. Such a property enables curing and provides adequate properties to the first layer once it is cured;
  said hydroxyl-terminated polymer of butadiene has hydroxyl functionality between 2.2 and 2.6. This ranged is particularly suitable for reinforcing a concrete structure;
  said curing agent comprises di- or polyisocyanates or a mixture thereof. This family of components shows a good curing capability in presence of a hydroxyl-terminated polymer of butadiene;
  the first layer further comprises a catalyst of the curing reaction mixed with the curing agent and the curable polymer. By selecting the type and quantity of catalyst, it is possible to accelerate or decelerate the curing reaction in order to adjust the duration after which the second layer can be applied;
  the thermoplastic matrix comprises polyamide, preferably polyamide 12, or poly(phenylene sulphide);
  one or several additional layers are applied successively over the second layer, each of the additional layers comprising a composite including reinforcement fibres and a thermoplastic matrix, whereby the second layer and the additional layers are bound together by thermofusion. Each additional layer comprises a composite including reinforcement fibres and a thermoplastic matrix and is stuck to the preceding layer by thermofusion. In order to obtain thermofusion the preceding layer and the additional layer can be heated and the additional layer can be pressed against the preceding one. The result is a multi layer reinforcement. The advantage can be a better mechanical resistance (more reinforcement layers), a wider range of possibilities for the last layers (opposite the construction work) and a lower risk that the reinforcement layers (second layer and additional ones) fall apart after being applied, thanks to the fact the second layer adherence to the first one is immediate. For example, if the construction work is a potable water duct, the last layers can be chosen because they constitute an appropriate coating.

Reinforcement fibres may comprise carbon fibres. They may be glass fibres. They may be a mix a several kinds of fibres. Usually the fibres are woven to make a fabric.

The invention also deals with a reinforced construction work comprising a construction work having a surface, a first layer comprising a cured polymer, the first layer adhering on one hand to the surface of the construction work and on the other hand to a second layer comprising a composite including reinforcement fibres and a thermoplastic matrix.

The reinforced construction work can be obtained via a method as described above.

According to embodiments of the reinforced construction work, the following features may be added and/or combined:

the cured polymer comprises a polyurethane resulting from reaction of a hydroxyl-terminated polymer of butadiene with di- or polyisocyanates or a mixture thereof;
said hydroxyl-terminated polymer of butadiene has hydroxyl functionality between 2.2 and 2.6;
the thermoplastic matrix comprises polyamide, preferably polyamide 12, or poly(phenylene sulphide);

BRIEF DESCRIPTION OF THE DRAWINGS

Non limiting embodiments of the invention will now be described with reference to the accompanying drawings, wherein.

DESCRIPTION OF EMBODIMENTS

Skilled artisans will appreciate that elements in the figures are illustrated for simplicity and clarity and have not necessarily been drawn to scale. For example, the dimensions of some of the elements in the figures may be exaggerated relative to other elements to improve the understanding of the embodiments of the present invention. Also, the same numeral references in the different figures correspond to a same element.

Figure 1:
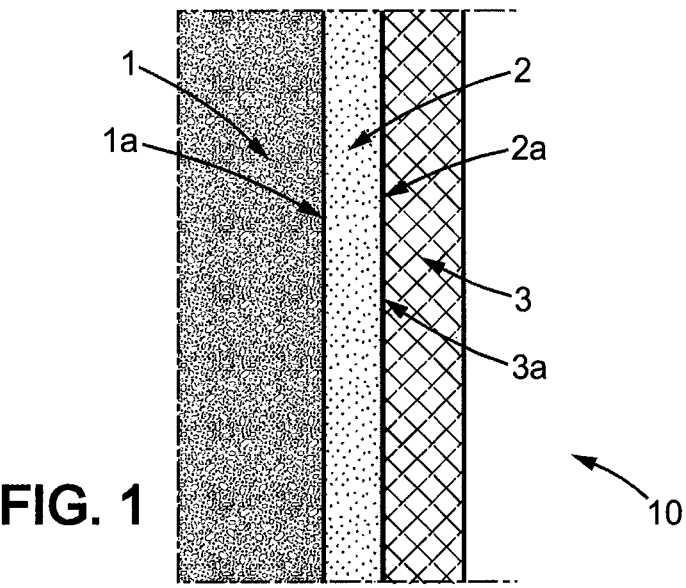
FIG. 1 is a section of a flat part of a reinforced construction work according to the invention.
Figure 2:
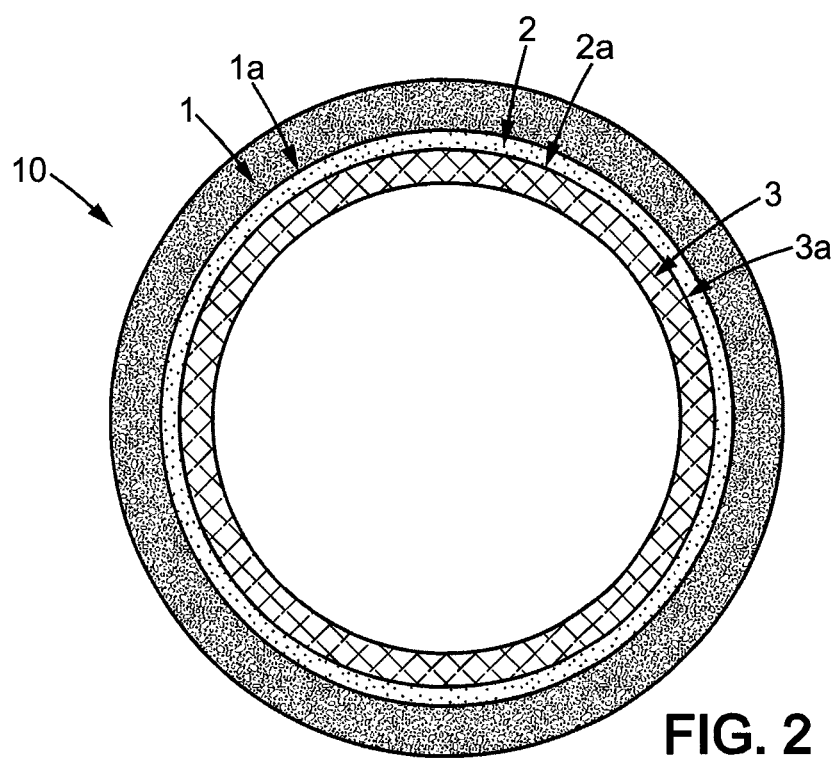
FIG. 2 is a section of a concrete water duct reinforced by a method according to the invention.

FIG. 1 and FIG. 2 both illustrate a reinforced construction work according to the invention and obtained using a method according to the invention. In FIG. 1, a flat construction work 1 is reinforced and only a limited extension is represented. In FIG. 2, the construction work 1 is a concrete water duct reinforced on its internal surface 1a.

To prepare a first layer 2, a three component resin is prepared, comprising:

hydroxyl-terminated polymer of butadiene with hydroxyl functionality of about 2.5, for example PolyBde (refer to table 1 below);

a conventional di- or polyisocyanate as a curing agent;

a catalyst (optional).

Without the catalyst, the weight fraction of PolyBd® is 5/6 while that of the curing agent is 1/6. In order the avoid crystallisation, the resin can be preheated at 50° C.

The layer is applied by spreading the mixture on the surface 1a of the construction work. After 2 hours, the first layer is cured into a polyurethane resulting from the reaction of a hydroxyl-terminated polymer of butadiene with di- or polyisocyanates.

TABLE 1

Examples of PolyBd ®
Hydroxyl Terminated Polybutadiene and Polyolefin Resins

| Trade Name | Product | Hydroxyl Functionality | 1,2-Vinyl % | Mol. Wt. Mn (g/mol) | OH Value (meq/g) | Viscosity Pa · s @ 30° C. | Comments |
|---|---|---|---|---|---|---|---|
| Poly bd | R-45HTLO | 2.5 | 20 | 2800 | 0.84 | 5 | standard product |
| Poly bd | R-20LM | 2.5 | 20 | 1350 | 1.7 | 1.4 | low vise version of R-45HTLO |
| Poly bd | LF1 | 2.35 | 31 | 2291 | 0.87 | 5 | lower fn; low vinyl |
| Poly bd | LF2 | 2.2 | 42 | 2029 | 0.89 | 5.3 | lower fn; medium vinyl |
| Poly bd | LF3 | 2.05 | 53 | 2474 | 0.9 | 5.8 | lower fn; high vinyl |
| Poly bd | 600E | 2.5 | 20 | 1350 | 1.7 | 7 | epoxidized; epoxy eq. wt 460 |
| Poly bd | 605E | 2.5 | 20 | 1450 | 1.74 | 22 | epoxidized; epoxy eq. wt 300 |

After heating a surface 2a of the first layer 2, a second layer 3 is applied on surface 2a of the first layer. If needed, the second layer 3 can also be heated. Temperature at the interface between the first and second layers can be in the range of 110-130° C.

The second layer 3 consists of a composite including woven carbon fibres and a thermoplastic matrix such as polyamide 12. Such a composite fabric is available from Soficar under the name Carbostamp®.

The second layer immediately adheres to the first one.

The invention has been described above with the aid of embodiments without limitation of the general inventive concept which appears from the claims and the general portion of the description.

The invention claimed is:

1. A method of reinforcing a construction work, comprising:

applying a first layer on a surface of the construction work, the first layer comprising a curable polymer that, once cured, can be thermally activated for adhering to a thermoplastic material;

curing said curable polymer;

heating at least a surface of the first layer opposite said surface of the construction work, for thermal activation of the cured polymer; and applying a second layer over said surface of the first layer, the second layer comprising a composite including reinforcement fibres and a thermoplastic matrix, wherein a temperature at an interface between the first and second layers during application of the second layer is in a range of 110° C.-130° C., whereby the thermoplastic matrix and the thermally activated cured polymer adhere to each other.

2. The method of claim 1, wherein the first layer further comprises a curing agent mixed with the curable polymer, and wherein curing said curable polymer comprises using a reaction between the curing agent and the curable polymer.

3. The method of claim 2, wherein said curable polymer is a hydroxyl-terminated polymer of butadiene.

4. The method of claim 3, wherein said hydroxyl-terminated polymer of butadiene has hydroxyl functionality above or equal to 2.0.

5. The method of claim 4, wherein said hydroxyl-terminated polymer of butadiene has hydroxyl functionality between 2.2 and 2.6.

6. The method of claim 2, wherein said curing agent comprises di- or polyisocyanates or a mixture thereof.

7. The method of claim 2, wherein the first layer further comprises a catalyst of the curing reaction mixed with the curing agent and the curable polymer.

8. The method of claim 1, wherein the thermoplastic matrix is selected from the group consisting of a polyamide, polyamide 12, and a polyphenylene sulphide.

9. The method of claim 1, further comprising applying one or several additional layers successively over the second layer, each of the additional layers comprising a composite including reinforcement fibres and a thermoplastic matrix, and wherein the applying step comprises binding the second layer and the additional layers together by thermofusion.

10. A method of reinforcing a construction work, comprising:
  applying a first layer on a surface of the construction work, the first layer comprising a curable polymer that, once cured, can be thermally activated for adhering to a thermoplastic material;
  curing said curable polymer;
  heating at least a surface of the first layer opposite said surface of the construction work, for thermal activation of the cured polymer;
  applying a second layer over said surface of the first layer, the second layer comprising a composite including reinforcement fibres and a thermoplastic matrix, whereby the thermoplastic matrix and the thermally activated cured polymer adhere to each other; and
  applying one or several additional layers successively over the second layer, each of the additional layers comprising a composite including reinforcement fibres and a thermoplastic matrix, and wherein the applying step comprises binding the second layer and the additional layers together by thermofusion.

* * * * *